July 12, 1966   F. HUGHES   3,260,507
COME-ALONG ATTACHMENT FOR POWER LINE CABLES
Filed Jan. 20, 1964
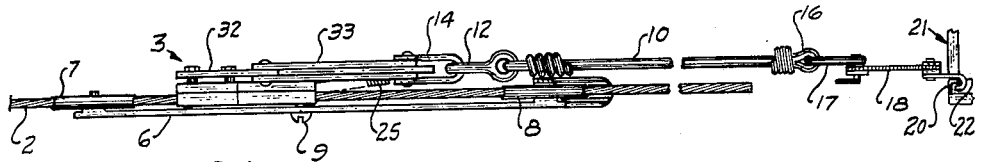
FIG. 1
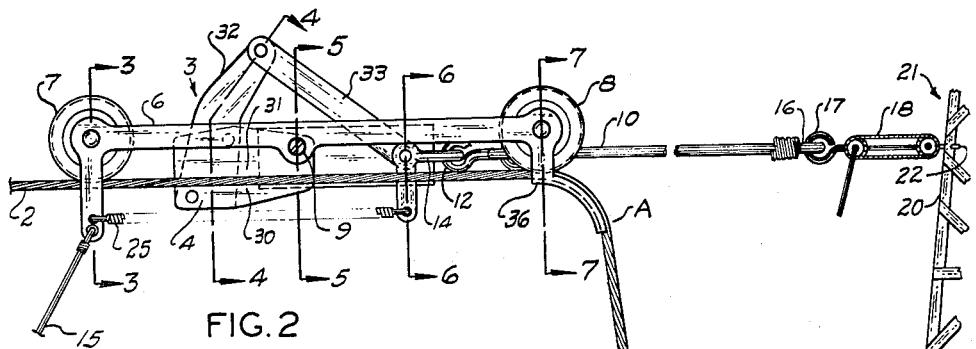
FIG. 2
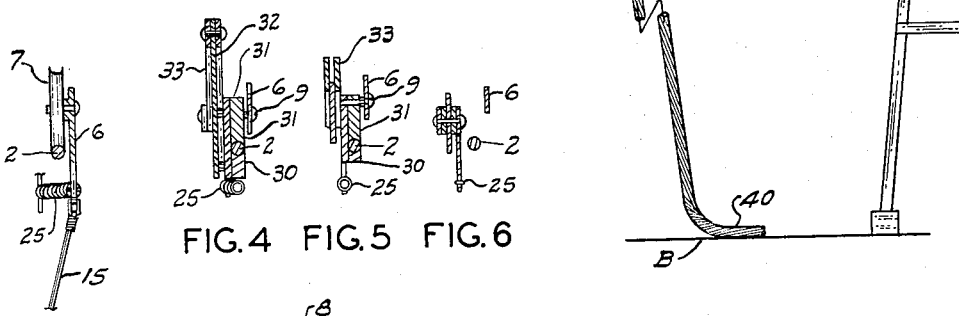
FIG. 4   FIG. 5   FIG. 6
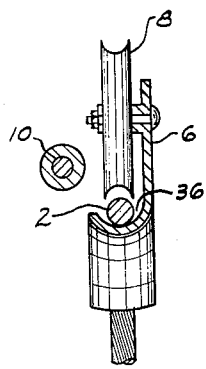
FIG. 3
FIG. 7
INVENTOR.
Franklin Hughes

United States Patent Office 3,260,507
Patented July 12, 1966

3,260,507
COME-ALONG ATTACHMENT FOR POWER LINE CABLES
Franklin Hughes, 1414 E. Cinnabar Ave., Phoenix, Ariz.
Filed Jan. 20, 1964, Ser. No. 338,907
3 Claims. (Cl. 254—134.3)

This invention concerns a come-along attachment for power line cables.

Heretofore power line cables have been stretched and tensioned by makeshift apparatus attached to the cable at one end and to one of the uprights of a tower at the other end. This had the objection that too much time was consumed in attaching and detaching the improvised apparatus. Another improvision was the use of extension poles that were extended upwardly from the ground and used to direct and position the power cable so that it could be attached to a take-up. This had the objection that the extension poles were very long and unwieldy and extended too far from the ground.

Another improvision was the use of an elevatable platform mounted on a truck which would serve the purpose of positioning workmen close to the point where the attachment of the power cable was to be made to the tower.

One of the objects of my invention is to provide a come-along attachment which can be used to attach a power cable having one end secured to a tower or the like and its other end lying on the ground adapted to be connected to a second tower. The attachment is positioned near the ground end of the cable and a second cable attached by a chain hoist to the second tower is secured to the attachment in order that the power cable can be stretched and taken up to any degree desired. Additionally, the attachment has a channel member adjacent the free end of the power cable which serves to elevate a segment of the free end of the power cable and thereby maintain an additional portion of the free end of the power cable from coming into contact with the ground.

Another object is to provide a carriage provided with pulley wheels which will run on the power line cable and support a come-along clamp whereby this device can be attached to a take-up cable attached by a chain hoist to the tower.

Still another object is to provide a mobile tensioning frame having pulleys to run on the power line cable, a power line come-along clamp, means for attachment to a chain hoist, and means for attaching a guide line to act as a tow rope to move the frame back over the strung power cable.

Still another object is to provide a frame, as above described, for guiding means to support and direct a power cable so that a major portion of it is supported above the ground during the operation of stretching it to the desired tension in order that a minimal amount of cable will contact the ground.

Other objects will appear hereinafter.

I attain the foregoing objects by means of the devices, parts and combinations of parts shown in the accompanying drawings in which:

FIGURE 1 is a plan view of my come-along attachment;

FIGURE 2 is a side elevational view of the device as shown in FIGURE 1 showing the power line cable, a tensioning cable, and a chain hoist take-up connected between the tensioning cable and one leg of a tower.

FIGURE 3 is a vertical section of the device taken substantially on line 3—3 of FIGURE 2;

FIGURE 4 is a section taken substantially on line 4—4 of FIGURE 2;

FIGURE 5 is a section taken substantially on line 5—5 of FIGURE 2;

FIGURE 6 is a section taken substantially on line 6—6 of FIGURE 2; and

FIGURE 7 is a section taken substantially on line 7—7 of FIGURE 2 and drawn on an enlarged scale.

In the drawings, numeral 2 indicates the power line cable; numeral 3 indicates my come-along attachment in general. Numeral 4 indicates a come-along clamp which is attached to frame 6 by bolt 9 which has pulleys 7 and 8 which run on and are supported by cable 2. Cable 10 is a take-up cable which is attached by eye hook 12 to a bail 14 attached to the front end of the come-along clamp. At the forward end of cable 10 there is an eye 16 which engages hook 17 on chain hoist 18. The details of the chain hoist form no part of the present invention and may take any desired shape as, for example, the chain hoist as shown in Patent 2,907,549 issued to D. H. Walker. Chain hoist 18 is, in turn, attached to leg 20, or other portion of tower 21 by a hook 22.

The power cable 2 is gripped by clamp 4 comprising a lower jaw 30, an upper jaw 31 and leverage arrangement 32 and 33. The levers operate to close the jaws on the cable when tension is applied through cable 10, eye 12 and bail 14. The clamp is biased to an open position by a spring 25 which provides tension in the opposite direction to the pull applied by cable 10.

Pulleys 7 and 8 are adapted to engage cable 2 and gain support therefrom while the cable at its forward end A is threaded through a downwardly curved guide channel 36. This guide prevents an additional portion of the forward end A of the cable from contacting the ground B.

The elevation of this additional segment of the cable serves to protect this segment from ground attained abrasive scratches which form points of weaknesses from which electricity is discharged and lost. Referring to FIGURE 2 is can be seen that removal of the guide 36 would cause the cable 2 to drop toward the ground adjacent the end of the clamp 4.

When the clamp 4 has been engaged, pull of the chain hoist 18 on cable 10 will keep it in gripping condition. The chain hoist can then be used to draw the frame 6 of the attachment device toward, for example, leg 21 of the tower. In this way the power cable 2 may be taken up and stretched until the proper tension is attained. At the same time a portion of the free end of the cable is held above the ground B or out of excessive contact with it.

When this tension is attained, then the usual attachment sleeves (not shown) may be pressed onto the end 40 of the cable and thereafter any excess length of cable may be cut off if desired. The sleeves are then used to anchor and attach the forward end of the cable to insulators (not shown) attached to the tower or to proper cross arms thereon.

When the chain hoist 18 is reversed and the pull released on cable 10, the entire device 3 may be moved on cable 2 away from tower 20 by using towing rope 15.

I claim:

1. A come-along attachment for tensioning power line cables when joining them onto parts of supporting towers, comprising a frame having a horizontal bar with a front end and a rear end, grooved pulleys journalled at each end of said frame, a come-along cable clamp having a pair of jaws attached to approximately the center of said horizontal bar, lever means on said frame connected to said jaws and operative to open and close said jaws, a bail on the lever means adjacent the front end of said frame, a clamping cable, connected at one end to the bail a chain hoist attached to the other end of said clamping cable, means attaching said chain hoist to one of said supporting towers, a spring on said lever means normally holding said jaws in no-clamping position, a downwardly and forwardly curved guide channel on the front end of said frame horizontal bar to support the power line cable, being tensioned, and a tow rope attached to the rear of said frame.

2. A come-along attachment for tensioning power line cables when joing then onto parts of supporting towers, comprising a frame having a horizontal bar with a front end and a rear end, grooved pulleys journalled at each end of said frame, a come-along cable clamp attached to approximately the middle of said horizontal bar, lever means on said frame to open and close said jaws, a forwardly extending clamping cable to operate said lever means and close said jaws, a chain hoist attached to the forward end of said clamping cable, a spring connecting to said lever means and said frame normally holding said jaws open, a downwardly and forwardly curved arcuate guide channel on the front end of said frame horizontal bar, and a rope attached to the rear of said frame for attaining rearward movement of said frame.

3. An attachment for tensioning a power line cable between two spaced support members, said attachment comprising a frame including a horizontal member, pulleys at each end of the horizontal member adapted to bear on the power line cable, a clamp secured to said frame having upper and lower jaws adapted to securely engage an upper and lower portion of the cable, lever means on said frame connected to said jaws for forcing said jaws together, spring means positioned between said jaws and said frame normally holding said jaws in an open position, a take up means connected to said lever means near one of said pulleys and to a chain hoist located on one of said support members for causing said jaws to engage the cable against the bias of said spring means when a force is exerted thereon by said chain hoist, a depending member secured to said horizontal member adjacent the other pulley and means adapted to be connected to said depending member for exerting a force on the horizontal member and pulleys for towing the frame toward the other support member.

References Cited by the Examiner

UNITED STATES PATENTS 2,140,837  12/1938  Harry _____ 24—134
2,907,549  10/1959  Walker _____ 254—65

FOREIGN PATENTS 135,759  5/1952  Sweden.

WILLIAM FELDMAN, *Primary Examiner.*

OTHELL M. SIMPSON, *Examiner.*